US011673614B2

United States Patent
Moarefi et al.

(10) Patent No.: US 11,673,614 B2
(45) Date of Patent: Jun. 13, 2023

(54) CONNECTING ASSEMBLY, METHOD FOR MANUFACTURING A CONNECTING ASSEMBLY, VEHICLE BODY STRUCTURE, AND METHOD FOR ASSEMBLING A VEHICLE BODY STRUCTURE

(71) Applicants: Hyundai Motor Company, Seoul (KR); Kia Corporation, Seoul (KR)

(72) Inventors: Bahman Moarefi, Mainz (DE); Do Hoi Kim, Sejong (KR); Frank Rene Petetin, Mainz (DE)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/410,423

(22) Filed: Aug. 24, 2021

(65) Prior Publication Data
US 2022/0332375 A1 Oct. 20, 2022

(30) Foreign Application Priority Data
Apr. 19, 2021 (DE) .......................... 102021203824.7

(51) Int. Cl.
| | | |
|---|---|---|
| *B62D 25/06* | (2006.01) | |
| *B33Y 80/00* | (2015.01) | |
| *B62D 27/06* | (2006.01) | |
| *B62D 25/04* | (2006.01) | |

(52) U.S. Cl.
CPC ............. *B62D 27/06* (2013.01); *B62D 25/04* (2013.01); *B62D 25/06* (2013.01); *B33Y 80/00* (2014.12)

(58) Field of Classification Search
CPC ........ B62D 27/06; B62D 25/04; B62D 25/06; B33Y 80/00
See application file for complete search history.

(56) References Cited

U.S. PATENT DOCUMENTS

| | | |
|---|---|---|
| 3,596,940 A | 8/1971 | Horwitt et al. |
| 5,102,253 A | 4/1992 | Pugliesi-Conti et al. |
| 2021/0052112 A1* | 2/2021 | Chen ....................... A47J 42/16 |

FOREIGN PATENT DOCUMENTS

| | | | | |
|---|---|---|---|---|
| CN | 212462230 U | * | 2/2021 | |
| EP | 3287325 B1 | * | 9/2018 | ............. B60R 19/18 |
| EP | 3468317 A1 | * | 4/2019 | ........... B29C 64/106 |
| EP | 4011418 A1 | * | 6/2022 | |

OTHER PUBLICATIONS

Snap-Fit Joints for Plastic, A Design Guide, Bayer Material Science LLC.

\* cited by examiner

Primary Examiner — Rick K Chang
(74) Attorney, Agent, or Firm — Fox Rothschild LLP

(57) ABSTRACT

A connecting assembly for releasably connecting first and second parts includes a first connector including a frame part that has a receiving opening, at least one first snap fit structure integrally formed with the frame part and extending in the receiving opening, and a first coupling interface for coupling the first connector to the first part, and a second connector including a plug-in part that has an outer shape corresponding to the receiving opening of the frame part so that the plug-in part can be introduced into the receiving opening, at least one second snap fit structure integrally formed with the plug-in part on an inner surface of the plug-in part, the second snap fit structure being configured to releasably engage with the first snap fit structure, and a second coupling interface for coupling the second connector to the second part.

13 Claims, 10 Drawing Sheets

CONNECTING ASSEMBLY, METHOD FOR MANUFACTURING A CONNECTING ASSEMBLY, VEHICLE BODY STRUCTURE, AND METHOD FOR ASSEMBLING A VEHICLE BODY STRUCTURE

CROSS-REFERENCE TO RELATED APPLICATION

This application claims under 35 U.S.C. § 119 the benefit of German Patent Application No. 102021203824.7 filed on Apr. 19, 2021, the entire contents of which are incorporated herein by reference.

BACKGROUND

(a) Technical Field

The present disclosure relates to a connecting assembly including first and second connectors, a method for manufacturing the connecting assembly, a vehicle body structure, and a method for assembling the vehicle body structure.

(b) Description of the Related Art

Vehicles, in particular, automobiles that are typically manufactured using mass-production techniques, are highly modularized. For example, there is trend to combine a common platform, which includes a chassis, with various upper body structures or so called "hats". In order to further ease assembly of such vehicles, many substructures are pre-assembled before they become permanently fixed to each other. Thus, there is a need to optimize the pre-assembly process.

Generally, snap fit connectors are known as releasable connections. For example, U.S. Pat. No. 5,102,253 describes a snap fit device for releasably joining two parts, in which one part forms a plug and an opposite part forms a socket, and the parts are provided with male and female elastic snap fit structures. In a locked state, end faces of the parts are in contact with each other. A snap fit connector manufactured in a molding process is disclosed in U.S. Pat. No. 3,596,940.

SUMMARY

The present disclosure provides improved solutions for releasably assembling two parts.

To this end, the present disclosure provides a connecting assembly including first and second connectors, a method for manufacturing the connecting assembly, a vehicle body structure, and a method for assembling the vehicle body structure.

According to an aspect of the disclosure, a connecting assembly is configured to releasably connect a first part to a second part. The connecting assembly includes a first connector comprising a frame part that has a receiving opening extending in a first frame direction, at least one first snap fit structure integrally formed with the frame part and extending in the receiving opening along the first frame direction, and a first coupling interface for coupling the first connector to the first part. The receiving opening is defined by an inner surface of the frame part. For example, the receiving opening may have a substantially rectangular or oval cross-sectional shape including a longitudinal or central axis that defines the first frame direction. At least one first snap fit is arranged on and protrudes from the inner surface, wherein the first snap fit structure has a predefined expanse along the first frame direction and is elastically deformable towards and away from the inner surface of the frame part. In particular, a gap may be defined between the first snap fit structure and the inner surface of the frame part.

The connecting assembly further includes a second connector comprising a plug-in part that extends in a first plug direction and has an outer shape corresponding to the receiving opening of the frame part of the first connector so that the plug-in part is configured for being introduced into the receiving opening of the frame part with the first plug direction extending parallel to the first frame direction, at least one second snap fit structure integrally formed with the plug-in part and extending in a first plug direction on an inner surface of the plug-in part, the second snap fit structure being configured to releasably engage with the first snap fit structure, and a second coupling interface for coupling the second connector to the second part. Thus, the second connector, in particular, the plug-in part comprises an outer surface that, in a state in which the plug-in part is positioned within the receiving opening of the frame part, faces the inner surface of the frame part, and an inner surface that is oriented opposite to the outer surface of the plug-in part. The second snap fit structure is formed on the inner surface of the plug-in part. Thus, when the plug-in part is introduced into the receiving opening of the frame part, the plug-in part is slid into the gap formed between the first snap fit structure and the inner surface of the frame part along the first frame direction with the first plug direction parallel thereto, and the first snap fit structure and the second snap fit structure are caused to engage.

According to the disclosure, the frame part of the first connector and the plug-in part of the second connector each are manufactured in an additive manufacturing process from a metal material.

According to another aspect of the disclosure, a method for manufacturing a connecting assembly includes generating, layer by layer, the first connector from a metal raw material in an additive manufacturing process, and generating, layer by layer, the second connector from a metal raw material in an additive manufacturing process. For example, the additive manufacturing process may include a 3-D-printing method such as selective laser melting.

According to a further aspect of the disclosure, a vehicle body structure includes a connecting assembly, a first part fixed to the coupling interface of the first connector, and a second part fixed to coupling interface of the second connector, wherein the plug-in part of the second connector is positioned in the receiving opening of the frame part of the first connector, and wherein the second snap fit structure of the second connector is engaged with the first snap fit structure of the first connector.

According to yet a further aspect of the disclosure, a method for assembling a vehicle body structure includes coupling the first part to the coupling interface of the first connector, coupling the second part to the coupling interface of the second connector, introducing the plug-in part of the second connector into the receiving opening of the frame part of the first connector, and engaging the second snap fit structure of the second connector and the first snap fit structure of the first connector.

According to the present disclosure, it is possible to provide a mechanically stable connecting assembly with a first and a second connector that can easily be coupled to each other and decoupled from each other by snap fit structures. According to the disclosure, the first and second connectors are made in an additive manufacturing process from a metal material, e.g. from an aluminum alloy such as AlSi10Mg. Therefore, the connectors can be manufactured in a very accurate and mechanically robust manner with great freedom of design.

Since the first connector includes a receiving opening into which the second connector can at least partially be introduced, stability of the assembled connectors is improved and the assembling process is eased.

Further, as the first snap fit structure is provided on an inner surface of the first connector and the second snap fit structure is provided on an inner surface of the second connector, the plug-in part of the second connector is clamped between the first snap fit structure and the inner surface of the frame part along the first frame direction with the first plug direction parallel thereto, and the first snap fit structure and the second snap fit structure are caused to engage. This provides the advantage that a very stable attachment between first and second connector is achieved. Further, it eases decoupling the connectors from each other because the first snap fit structure is easily accessible.

Further embodiments of the present disclosure are subject of the further sub-claims and of the following description, referring to the drawings.

According to some embodiments the first snap fit structure includes an elastic member extending in the first frame direction between a first end coupled to an inner surface of the frame part that defines the receiving opening and a second end that is movable relative to the first end by elastically deforming the elastic member, and a locking portion formed on the second end of the elastic member, wherein the plug-in part includes a central recess defined by the inner surface of the plug-in part, and wherein the second snap fit structure includes a snap in recess formed on the inner surface of the plug-in part, the snap in recess being configured to receive the locking portion of the first snap fit structure. The locking portion of the elastic member may, for example, be a protrusion protruding from the elastic member towards the inner surface of the frame part. For example, the protrusion may have a rounded shape or may include a ramp surface in order to ease sliding into the recess forming the second snap fit structure. These configurations further ease coupling and decoupling of the connectors.

According to some embodiments the receiving opening extends between a first and a second end of the frame part, the first and the second end lying opposite to each other with respect to the first frame direction. Thus, the receiving opening may be a through hole or channel. This further eases decoupling the first and second connectors from each other because the snap fit structures are better accessible.

According to some embodiments the receiving opening includes a first receiving portion having a first width with regard to a second frame direction extending transverse to the first frame direction, and a second receiving portion having second width with regard to the second frame direction, the second width being smaller than the first width, wherein the second receiving portion extends along a third frame direction which extends transverse to the first and to the second frame directions. Thus, the receiving opening may include broad, for example, rectangular or oval portion, and a smaller portion. Thus, a specific profile or course of the circumference of the receiving opening is defined. On the one hand, this eases assembly because the plug-in part may only be introduced into the receiving opening in one specific orientation. On the other hand, since the second, small portion is positioned neighbored to the first portion in the third frame direction, loads can be better distributed over the inner surface of the frame part.

According to some embodiments the first and the second receiving portion define a substantially T-shaped recess. Thereby, a simple geometric form is defined which can easily be manufactured.

According to some embodiments the second receiving portion forms an opening at a first vertical end of the frame part with regard to the third frame direction. Thus, the plug-in part of second connector can be introduced into the receiving opening such that the second connector completely overlaps with the first connector with respect to the first frame direction. Thereby, a very compact connecting assembly is provided that is able to be installed in various constructive configurations in a space saving manner.

According to some embodiments the at least one first snap-fit structure is formed in the first receiving portion. For example, multiple first snap fit structures may be arranged spaced along the circumference of the first receiving portion. As the first snap fit structures are arranged in the first, broad section of the receiving opening, accessibility is further eased.

According to some embodiments the plug-in part includes a first plug portion having a first width with regard to a second plug direction extending transverse to the first plug direction, and a second plug portion having second width with regard to the second plug direction, the second width of the second plug portion being smaller than the first width of the first plug portion, wherein the second plug portion extends along a third plug direction which extends transverse to the first and to the second plug directions. Thus, the plug-in part includes a broad first plug portion for being introduced into the broad, first receiving portion of the frame part, and a smaller second plug portion for being introduced into the small, second receiving portion of the frame part.

According to some embodiments the first part or the second part is a B-pillar module, and the other one of the first part or the second part is a roof module.

The features and advantages disclosed in connection with one aspect of the disclosure are also disclosed for the other aspects of the disclosure and vice versa.

BRIEF DESCRIPTION OF THE DRAWINGS

For a more complete understanding of the present disclosure and advantages thereof, reference is now made to the following description taken in conjunction with the accompanying drawings. The disclosure is explained in more detail below using exemplary embodiments, which are specified in the schematic figures, in which.

Unless indicated otherwise, like reference signs to the figures indicate like elements.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
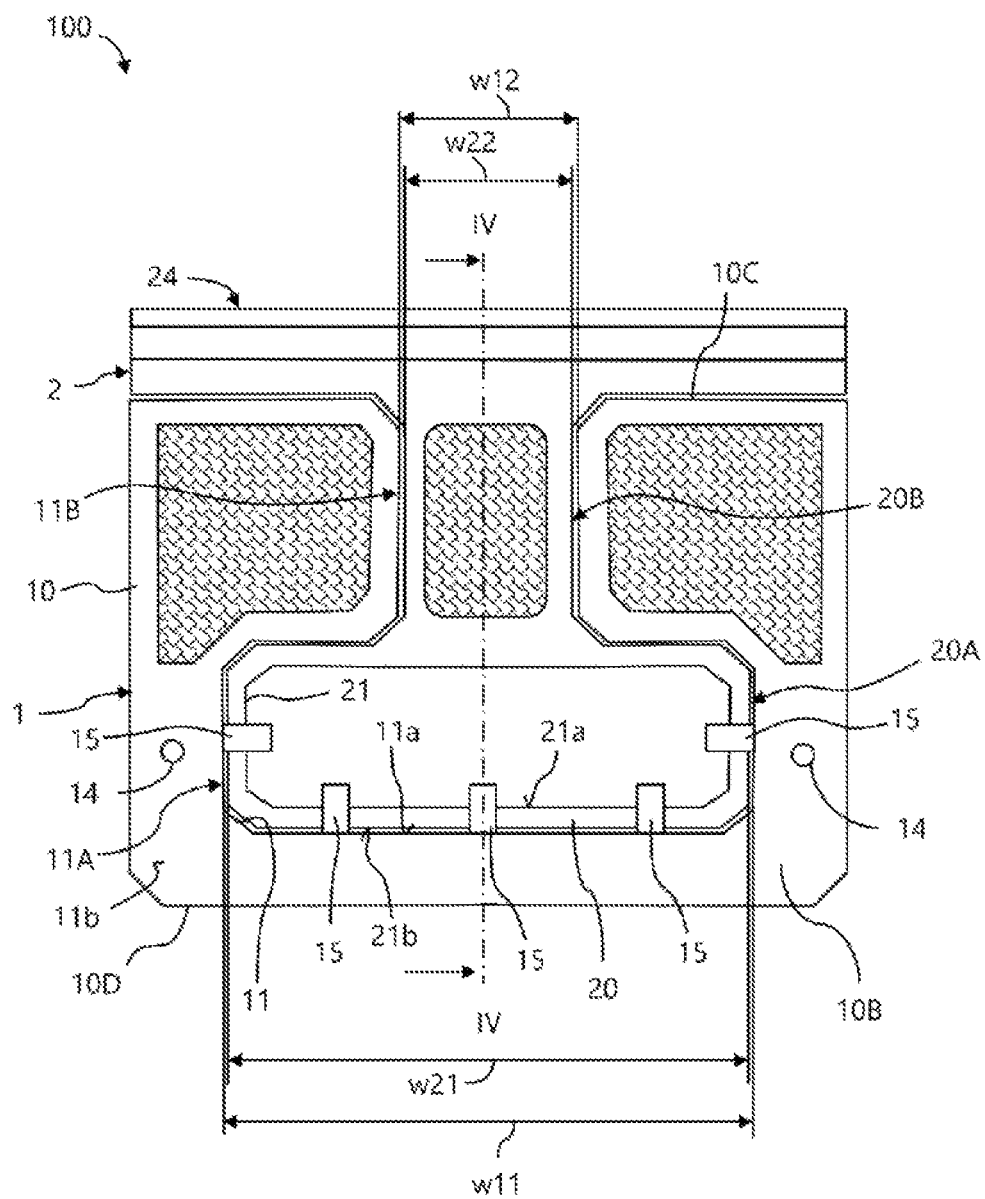
FIG. 1 shows front view to a connecting assembly according to an embodiment of the disclosure in an assembled state.
Figure 2:
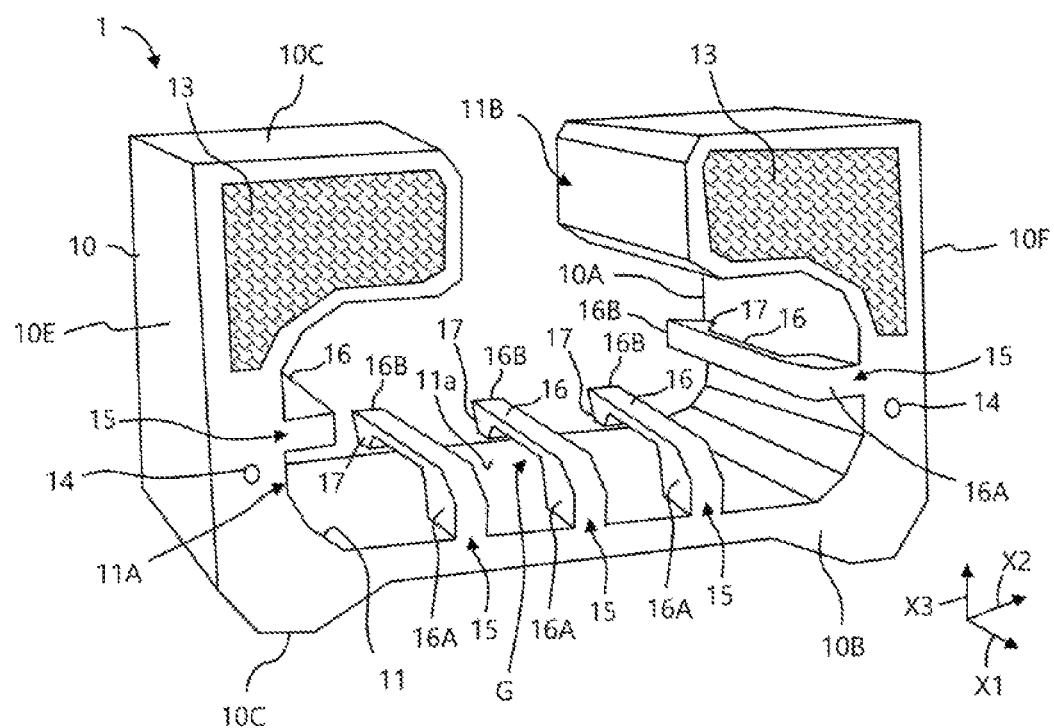
FIG. 2 shows a perspective view of a first connector according to an embodiment of the disclosure.
Figure 3:
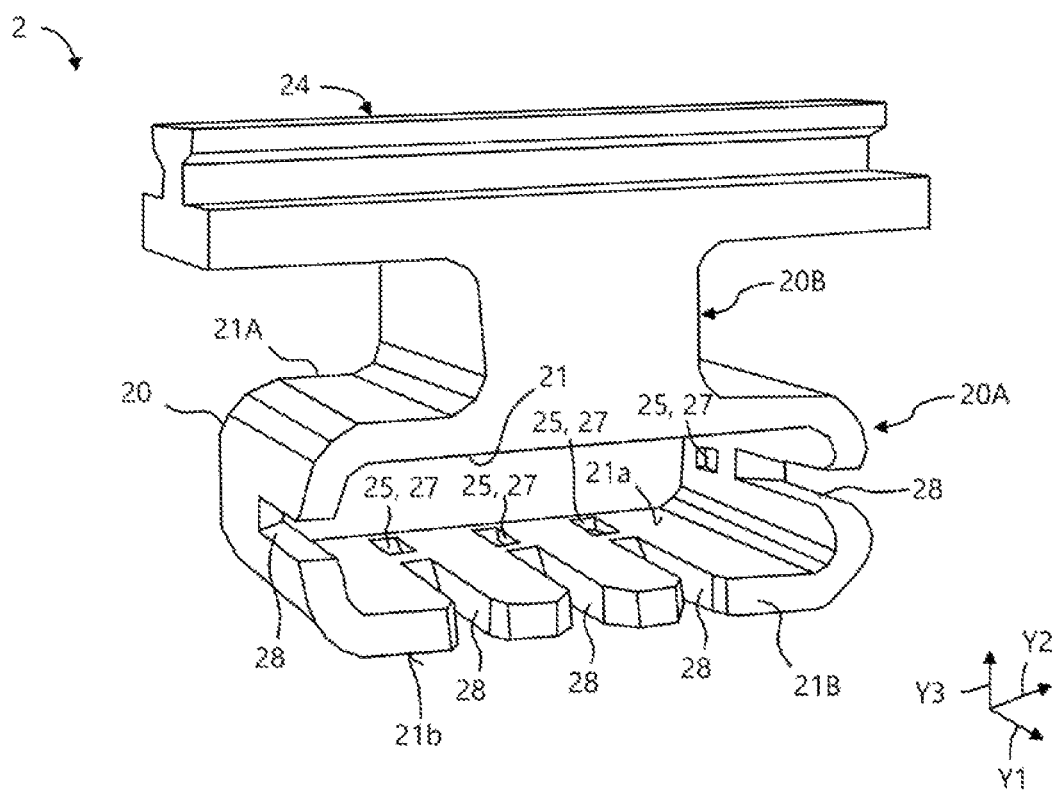
FIG. 3 shows a perspective view of a second connector according to an embodiment of the disclosure.

FIG. 1 schematically shows a connecting assembly 100 for releasably connecting a first part A to a second part B. As shown in FIG. 1, the connecting assembly 100 includes a first connector 1 and a second connector 2. FIG. 2 shows a perspective view of the first connector 1. FIG. 3 shows a perspective view of the second connector 2.

As exemplarily shown in FIGS. 1 and 2, the first connector 1 includes a frame part 10, at least one first snap fit structure 15, and a first coupling interface 14. As shown in FIG. 2, the frame part 10 may be realized as a substantially block shaped part extending in first frame direction X1 between a first end 10A and an opposite second end 10B, in a second frame direction X2 between a first horizontal end 10E and a second horizontal end 10F, and in a third frame direction X3 between a first vertical end 10C and a second vertical end 10D. The second frame direction X2 extends transverse to the first frame direction X1. The third frame direction X3 extends transverse to the first and the second frame direction X1, X2.

As further shown in FIGS. 1 and 2, the frame part 10 includes a receiving opening 11. The receiving opening 11 generally defines a central axis extending in the first frame direction X1. For example, the receiving opening 11 may be a through hole extending in the first frame direction X1 between the first end 10A and the second end 10B of the frame part 10 as exemplarily shown in FIG. 2. The receiving opening 11 is defined by an inner surface 11a of the frame par 10.

As schematically shown in FIGS. 1 and 2, the receiving opening 11 may include a first receiving portion 11A and a second receiving portion 11B. The first and second receiving portions 11A, 11B generally form continuous regions of the receiving opening. The second receiving portion 11B extends from the first receiving portion 11A along a third frame direction X3. Optionally, the second receiving portion 11B may form an opening at the first vertical end 10C of the frame part 10 with regard to the third frame direction X3, as exemplarily shown in FIGS. 1 and 2. The first receiving portion 11B may, for example, be positioned in the region of the second vertical end 10D of the frame part 10.

As exemplarily shown in FIGS. 1 and 2, the first and the second receiving portion 11A, 11B, together, may define a substantially T-shaped recess. However, the receiving opening 11 is not limited to this shape. In general, the first receiving portion 11A may comprise a first width w11 with regard to the second frame direction X2, and the second receiving portion 11B may have a second width w12 with regard to the second frame direction X2, wherein the second width w12 is smaller than the first width w12.

Figure 4:
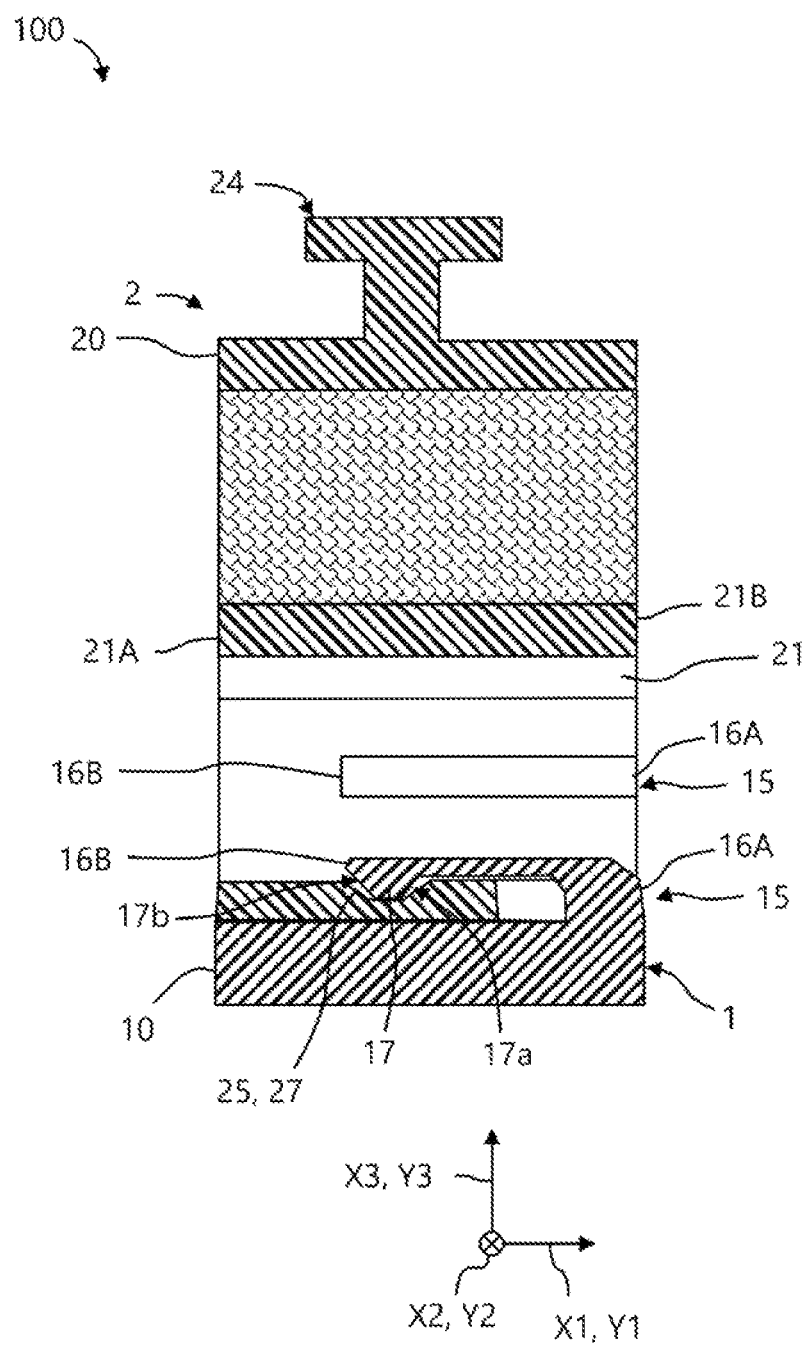
FIG. 4 shows a cross-sectional view along line IV-IV of the connecting assembly of FIG. 1.

As further shown in FIGS. 1 and 2, the first connector may include a plurality of first snap fit structures 15. However, generally it would be sufficient to provide at least one first snap fit structure 15. As schematically shown in FIG. 2, the first snap fit structure 15 may include an elastic member 16 and a locking portion 17. The elastic member 16 longitudinally extends between a first end 16A and a second end 16B, wherein the locking portion 17 is provided at the second end 16B. As exemplarily shown in FIG. 2, the locking portion 17 may be formed by a protrusion protruding transverse to the longitudinal expanse of the elastic member 16. As shown in FIG. 4, the protrusion forming the locking portion 17 may, for example, comprise inclined surfaces 17a, 17b.

The at least one first snap fit structure 15 is arranged in the receiving opening 11 of the frame part 10, optionally in the first receiving portion 11A, as exemplarily shown in FIG. 2. If more than one first snap fit structure 15 is provided, the first snap fit structures 15 may be arranged spaced to each other along the circumference of the receiving opening 11, as schematically shown in FIGS. 1 and 2. As further shown in FIG. 2, the elastic members 16 may be oriented such that the first end 16A of the elastic member 16 faces the second end 10B of the frame part 10 and the second end 16B of the elastic member 16 faces the first end 10A of the frame part 10. Thus, the longitudinal member 16 extends in the first frame direction 10. As further schematically shown in FIG. 2, the elastic member 16 may include a stand at its first end 16A which protrudes from the inner surface 11a of the frame part 10, so that the elastic member 16 between the first and second ends 16A, 16B extends spaced to the inner surface 11a of the frame part 10. Thereby, a gap G is formed between the inner surface 11a and the elastic member 16. Further, the locking member 17 faces the inner surface 11a of the frame part 10. The first snap fit structure 15 is not limited to this specific configuration. For example, the locking member 17 may also be formed by a recess. Generally, the first snap fit structure 15 is elastically deformable towards and away from the inner surface 11a of the frame part 10, and a gap G extending in the first frame direction X1 is defined between the inner surface 11a and the first snap fit structure 15.

Figure 5:
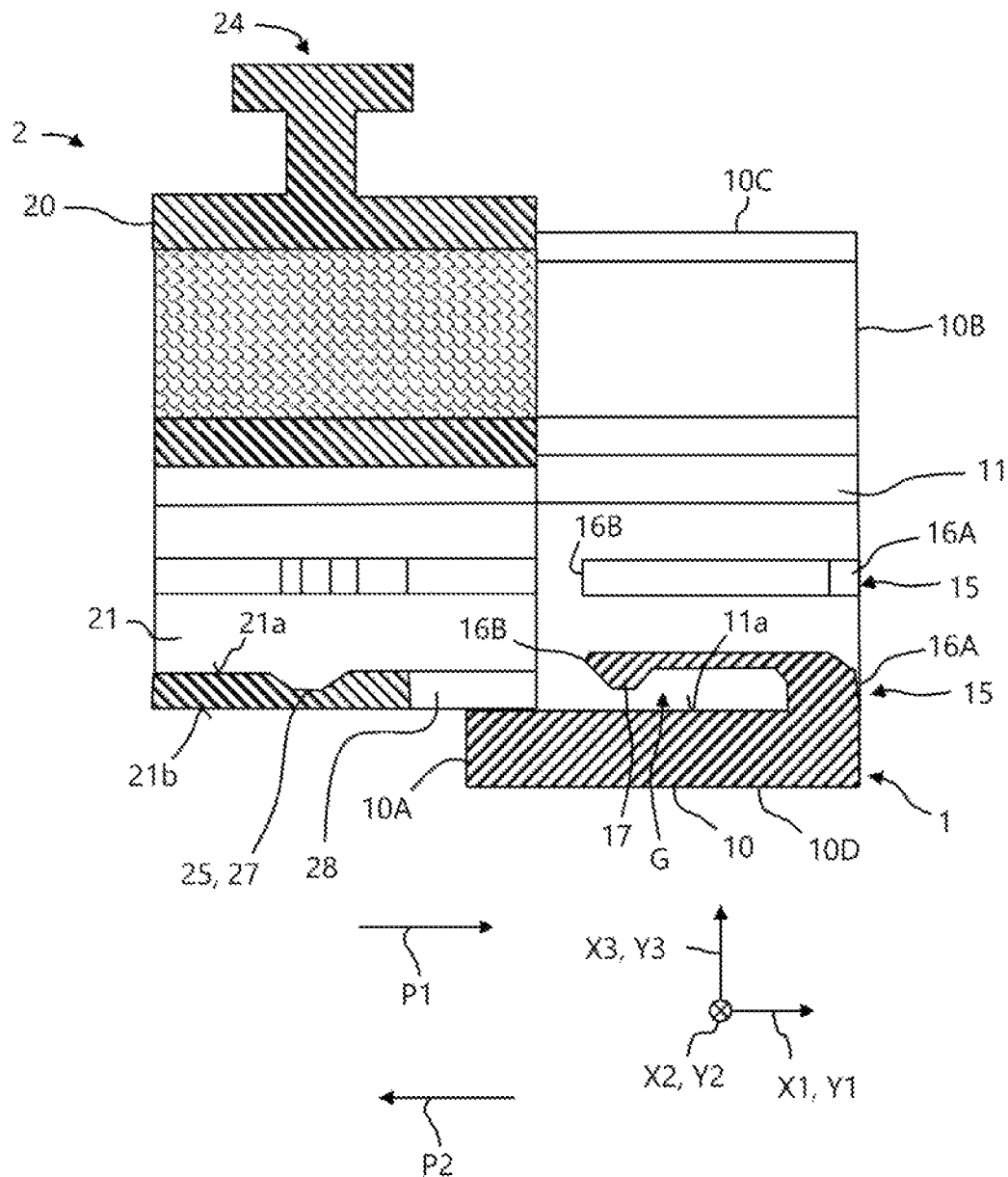
FIG. 5 shows a cross-sectional view along line IV-IV of the connecting assembly of FIG. 1 in a state of assembling or disassembling the first and second connectors.

As schematically shown in FIGS. 4 and 5, at least the first snap fit structure 15 is integrally formed with the frame part 10 as a monolithic structure. The frame part 10 and the snap fit structure 15 are formed from a metal material, e.g. from an aluminum alloy or another metal material, in an additive manufacturing process, e.g. a 3D-printing process. 3D or AM techniques are procedures for building up three-dimensional solid objects based on digital model data. 3D/AM employs an additive process where layers of material are sequentially built up in different shapes.

As schematically shown in FIGS. 1 and 2, the frame part 10 generally may be made of solid material; however, optionally, the frame part 10 may comprise regions 13 in which the metal material forms a cellular structure. For example, cellular regions 13 may be provided in the region of the first vertical end 10C and extend in the third frame direction X3 towards the second vertical end 10D. Providing cellular regions 13 advantageously reduces the overall weight of the first connector 1.

The first coupling interface 14 of the first connector 1 is provided for mechanically coupling the first connector 1 to the first part A. As schematically shown in FIG. 1, the first coupling interface 14 may, for example, include one or more openings or bores for receiving screws or bolts, the openings being formed in the frame part 10. However, the first coupling interface 14 is not limited thereto and, for example, may also be formed by an outer surface 11b of the frame part 10.

The second connector 2 generally is formed so as to be configured for being at least partially introduced into the receiving opening 11 of the first connector 1. As schematically shown in FIGS. 1 and 3, second connector 2 includes a plug-in part 20, at least one second snap fit structure 25, and a second coupling interface 24.

As shown in FIGS. 1 and 3, the plug-in part 20 may include a first plug portion 20A in the form of a closed frame. Generally, the first plug portion 20A may include an inner surface 21a defining an opening or central recess 21, and an outer surface 21b that is oriented opposite to the inner surface 21a. The central recess 21 defines a central axis which extends along a first plug direction Y1. Thus, the central recess 21 extends in a first plug direction Y1. A second plug direction Y2 extends transverse to the first plug direction Y1. A third plug direction Y3 extends transverse to the first and the second plug direction Y1, Y2.

As exemplarily shown in FIG. 3, the central recess 21 may be realized as a through hole extending between opposite first and second ends 21A, 21B of the plug-in part 20. As becomes apparent in particular from FIG. 1, the outer surface 21b may define a shape of the first plug portion 20A that corresponds to the shape of the first receiving portion 11A of the receiving opening 11 of the frame part 10 of the first connector 1.

Optionally, the plug-in part 20 may further include a second plug portion 20B. As exemplarily shown in FIGS. 1 and 3, the second plug portion 20B may be realized as a block shaped part which adjoins the first plug portion 20A in the third plug direction Y3. Optionally, the second plug portion 20B may extend in the first plug direction Y1 between the first and the second end 21A, 21B of the plug-in part 20. As shown in FIG. 1, the first plug portion 20A may include a first width w21 with regard to the second plug direction Y2, and the second plug portion 20B may have second width w22 with regard to the second plug direction Y2, wherein the second width w22 of the second plug portion 20B is smaller than the first width w21 of the first plug portion 20A.

Thus, generally the plug-in part 20 extends in a first plug direction Y1 and has an outer shape corresponding to the receiving opening 11 of the frame part 10 of the first connector 1 so that the plug-in part 20 is configured for being introduced into the receiving opening 11 of the frame part 10, when it is oriented such that the first plug direction Y1 extends parallel to the first frame direction X1.

As schematically shown in FIG. 3, the second connector 2 may include multiple second snap fit structures 25. However, it would also be possible to provide only one second snap fit structure 25. Preferably, the number of second snap fit structures 25 of the second connector 2 may correspond to the number of first snap fit structures 15 of the first connector 1. As exemplarily shown in FIG. 3, the second snap fit structure 25 may be realized as recess 27 formed in the inner surface 21a of the plug-in part 20, in particular, of the first plug portion 20A. Thus, the second snap fit structure 25 is arranged in the central recess 21 of the plug-in part 20. As exemplarily shown in FIG. 3, the second snap fit structure 25 may be arranged in the region of the first end 21A of the plug-in part 20 with respect to the first plug direction Y1. As schematically shown in FIG. 5, the recess 27 forming the second snap fit structure 25 may include inclined surfaces defining a substantially trapezoidal cross-sectional shape of the recess. The second snap fit structure 25 is not limited to this specific configuration. For example, the second snap fit structure 25 may also be formed by a protrusion protruding from the inner surface 21a of the plug-in part 20. Generally, the second snap fit structure 25 includes a predefined expanse along the first plug direction Y1. The first snap fit structure 15 of the first connector 1 and the second snap fit structure 25 of the second connector 2 are formed complementary to each other so that they are configured to be releasably engaged.

Optionally, the plug-in part 20, in particular, the first plug portion 20 may be provided with a channel 28 extending in the first plug direction Y1 and forming an opening at the second end 21B, wherein the channel 28 extends between the inner and the outer surface 21a, 21b of the plug-in part 20. The channel 28 is formed in line with the second snap fit structure 25 with respect to the second frame direction Y2. As visible in FIG. 5, the channel 28 may receive the stand of the elastic member 16 of the first snap fit structure 15.

The second coupling interface 24 serves for mechanically coupling the second connector 2 to the second part B. For example, the second coupling interface 24 may be realized as a bar having a T-shaped cross-section. As exemplarily shown in FIGS. 1 and 3-5, the bar may extend along the second plug direction Y2 and may be attached to the second plug portion 20B at an end opposite to the first plug portion 20A. However, other configurations are possible, too. For example, one of the end faces of the plug-in part 20 with regard to the first plug direction Y1 or the surface of the second plug portion 20B facing away from the first plug portion 20A may serve as the second coupling interface 24, e.g. in the form of weld surface or similar.

As shown in FIGS. 4 and 5, at least the plug-in part 20 and the second snap fit structure 25, and optionally also the second coupling interface 24 are integrally formed as monolithic structures. The plug-in part and the snap fit structure 25 are formed from a metal material, e.g. from an aluminum alloy or another metal material, in an additive manufacturing process, e.g. a 3D-printing process.

As schematically shown in FIG. 1, the plug-in part 20 generally may be made of solid material, however, optionally, may comprise regions 23 in which the metal material forms a cellular structure. For example, a cellular region 23 may be provided in the region of the second plug portion 20B. Providing cellular regions 23 advantageously reduces the overall weight of the second connector 2.

As schematically shown in FIGS. 1, 4, and 5, for coupling the first and the second connector 1, 2 to each other, the connectors 1, 2 are oriented such that the first frame direction X1 is parallel to the first plug direction Y1. Then, the plug-in part 20 is introduced along the first frame direction X1 into the receiving opening, as indicated by arrow P1 in FIG. 5, with the second end 21B of the plug-in part 20 preferably ahead. When the second end 16B of the elastic member 16 comes into contact with the plug-in part 21 it deforms, the plug-in part 20 is introduced into the gap G until the locking member 17 engages the recess 27 formed in the inner surface 21a of the plug-in part 20. In this state, which is shown in FIGS. 1 and 4, the stand of the elastic member 16 is positioned in the channel 28 of the plug-in part 20. Generally, the first and second snap fit structures 15, 25 are engaged. As further exemplarily shown in FIGS. 1 and 4, the first plug portion 20A is positioned in the first receiving portion 11A of the receiving opening 11 and the second plug portion 20B is positioned in the second receiving portion 11B of the receiving opening 11. As shown in FIG. 4, it is possible that the second connector 2 is received completely within the first connector 1 with respect to the first frame direction X1.

For decoupling the first and second connectors 1, 2, they can simply be pulled from each other along the first frame direction X1 and the first plug direction Y1 as indicated by arrow P2 in FIG. 5. The locking portion 17 than slides out of the recess 27 due to the angled or inclined surfaces 17a, 17b.

Figure 9:
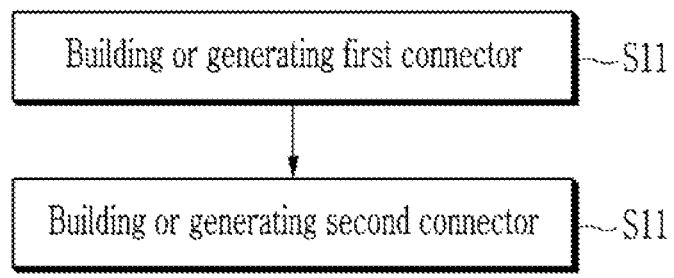
FIG. 9 shows a flow chart of a method for manufacturing a connecting assembly according to an embodiment of the disclosure.

The connecting assembly 100 may be produced or manufactured in a method which is schematically shown in FIG. 9. This method includes a step S11 in which the first connector 1 is built or generated layer by layer from a metal raw material in an additive manufacturing process. For example, the first connector 1 may be built along the first frame direction X1. In another step S12, the second connector 2 is generated or built layer by layer from a metal raw material in an additive manufacturing process. For example, the second connector 2 may be built along the first plug direction Y1. The additive manufacturing process may, for example, include selective laser melting.

Figure 6:
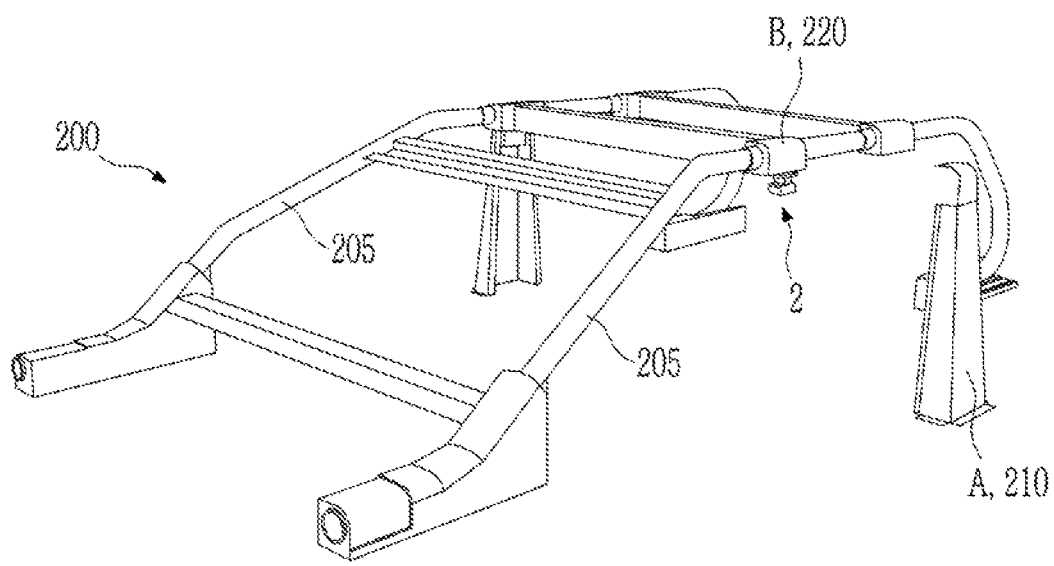
FIG. 6 shows a perspective view of a vehicle body structure according to an embodiment of the disclosure.

FIG. 6 exemplarily shows a vehicle body structure 200 for an automobile. As exemplarily shown in FIG. 6, the body structure 200 may include two lateral profiles 205 extending parallel to each other. The lateral profiles 205 may be connected to each other by roof modules 220 extending transverse to the lateral profiles 205. Further, a B-pillar extending transverse to the roof modules may be coupled to one of the roof modules 220.

Figure 7:
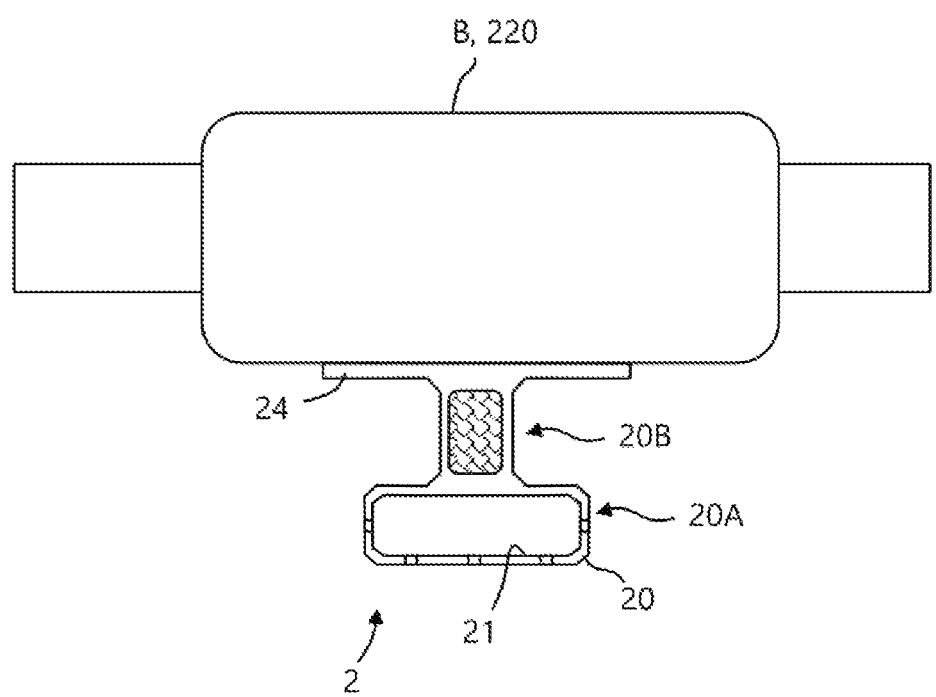
FIG. 7 shows detailed view of a part of the vehicle body structure of FIG. 6.

As schematically shown in FIGS. 6 and 7, the roof module 220 may form a second part B to which the second connector 2 is attached. For example, the second connector 2, with its coupling interface 24, may be permanently fixed to the roof module 2, e.g. in a form fitting manner.

Figure 8:
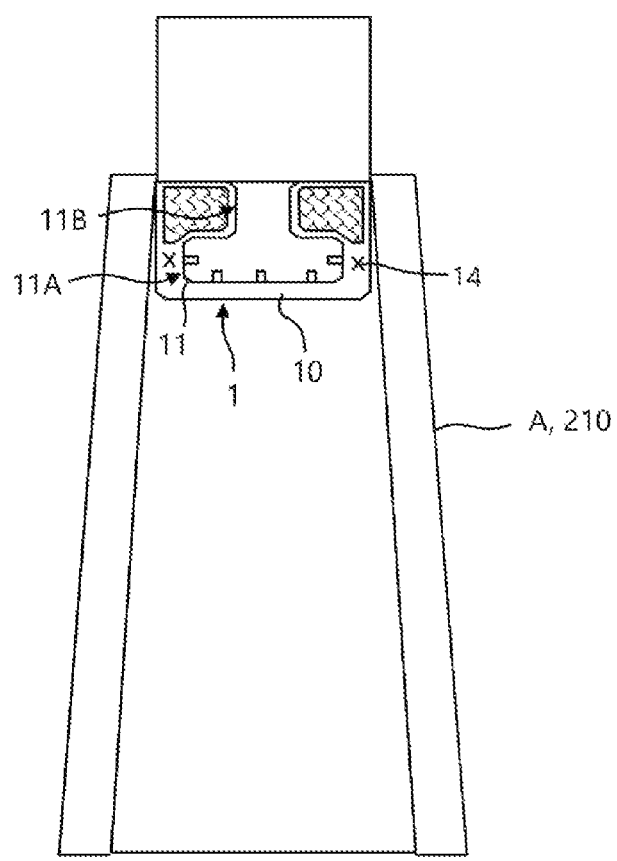
FIG. 8 shows detailed view of another part of the vehicle body structure of FIG. 6.

As schematically shown in FIGS. 6 and 8, the B-pillar 210 may form a first part A to which the first connector 1 is attached, in particular, permanently attached, e.g., welded or adhesively fixed. FIG. 6 schematically shows an exploded view of the vehicle body frame 200 in which the B-pillar 210 is shown separated from the roof module 220. However, in an assemble state, the first and second connectors 1, 2 are coupled to each other as described above, wherein the second snap fit structure 25 of the second connector 2 is engaged with the first snap fit structure 15 of the first connector 1.

Figure 10:
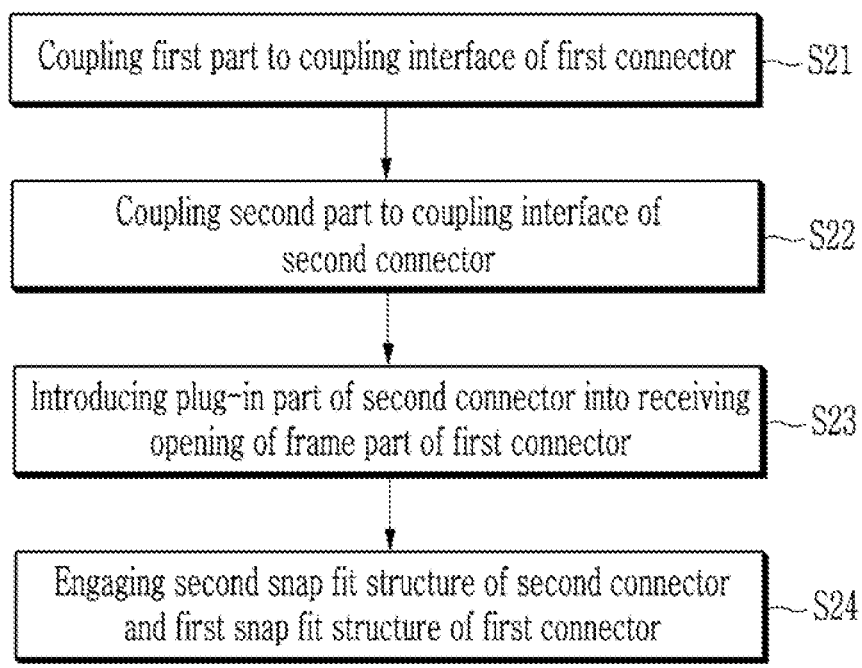
FIG. 10 shows a flow chart of a method for assembling a vehicle body structure according to an embodiment of the disclosure.

FIG. 10 schematically shows a method for assembling the vehicle body structure 200. The method includes a step S21 in which the first part A, i.e., the B-pillar, is coupled to the coupling interface 14 of the first connector 1, for example, by welding, screwing or similar. In further step S22, the second part B, i.e. the roof module 220 is coupled to the coupling interface 24 of the second connector 2. For example, the T-shaped bar may be received in a corresponding groove (not shown) of the second part B. Further, the plug-in part 20 of the second connector 2 is introduced into the receiving opening 11 of the frame part 10 of the first connector 1 (step S23) as described above. In step S24, the second snap fit structure 25 of the second connector 2 and the first snap fit structure 15 of the first connector 1 are engaged.

Although the connecting assembly has been described in connection with vehicles, in particular, automobiles, it is not limited thereto.

The disclosure has been described in detail referring to exemplary embodiments. However, it will be appreciated by those of ordinary skill in the art that modifications to these embodiments may be made without deviating from the principles and central ideas of the disclosure, the scope of the disclosure defined in the claims, and equivalents thereto.

What is claimed is:

1. A connecting assembly for releasably connecting a first part to a second part, comprising:
    a first connector comprising a frame part that has a receiving opening extending in a first frame direction, at least one first snap fit structure integrally formed with the frame part and extending in the receiving opening along the first frame direction, and a first coupling interface for coupling the first connector to the first part; and
    a second connector comprising a plug-in part that extends in a first plug direction and has an outer shape corresponding to the receiving opening of the frame part of the first connector so that the plug-in part is configured for being introduced into the receiving opening of the frame part with the first plug direction extending parallel to the first frame direction, at least one second snap fit structure integrally formed with the plug-in part and extending in first plug direction on an inner surface of the plug-in part, the second snap fit structure being configured to releasably engage with the first snap fit structure, and a second coupling interface for coupling the second connector to the second part;
    wherein the frame part of the first connector and the plug-in part of the second connector each are manufactured in an additive manufacturing process from a metal material.

2. The connecting assembly according to claim 1, wherein the first snap fit structure includes an elastic member extending in the first frame direction between a first end coupled to an inner surface of the frame part that defines the receiving opening and a second end that is movable relative to the first end by elastically deforming the elastic member, and a locking portion formed on the second end of the elastic member, wherein the plug-in part includes a central recess defined by the inner surface of the plug-in part, and wherein the second snap fit structure includes a snap in recess formed on the inner surface of the plug-in part (20), the snap in recess being configured to receive the locking portion of the first snap fit structure.

3. The connecting assembly according to claim 1, wherein the receiving opening extends between a first and a second end of the frame part, the first end and the second end lying opposite to each other with respect to the first frame direction.

4. The connecting assembly according to claim 1, wherein the receiving opening includes a first receiving portion having a first width with regard to a second frame direction extending transverse to the first frame direction, and a second receiving portion having second width with regard to the second frame direction, the second width being smaller than the first width, wherein the second receiving portion extends along a third frame direction which extends transverse to the first and to the second frame directions.

5. The connecting assembly according to claim 4, wherein the first receiving portion and the second receiving portion define a substantially T-shaped recess.

6. The connecting assembly according to claim 4, wherein the second receiving portion forms an opening at a first vertical end of the frame part with regard to the third frame direction.

7. The connecting assembly according to claim 4, wherein the first snap-fit structure is formed in the first receiving portion.

8. The connecting assembly according to claim 4, wherein the plug-in part includes a first plug portion having a first width with regard to a second plug direction extending transverse to the first plug direction, and a second plug portion having second width with regard to the second plug direction, the second width of the second plug portion being smaller than the first width of the first plug portion, wherein the second plug portion extends along a third plug direction which extends transverse to the first and to the second plug directions.

9. A method for manufacturing a connecting assembly, the method comprising:
preparing a connecting assembly for releasably connecting a first part to a second part, the connecting assembly comprising:
a first connector comprising a frame part that has a receiving opening extending in a first frame direction, at least one first snap fit structure integrally formed with the frame part and extending in the receiving opening along the first frame direction, and a first coupling interface for coupling the first connector to the first part; and
a second connector comprising a plug-in part that extends in a first plug direction and has an outer shape corresponding to the receiving opening of the frame part of the first connector so that the plug-in part is configured for being introduced into the receiving opening of the frame part with the first plug direction extending parallel to the first frame direction, at least one second snap fit structure integrally formed with the plug-in part and extending in the first plug direction on an inner surface of the plug-in part, the second snap fit structure being configured to releasably engage with the first snap fit structure, and a second coupling interface for coupling the second connector to the second part,
wherein the frame part of the first connector and the plug-in part of the second connector each are manufactured in an additive manufacturing process from a metal material;
generating, layer by layer, the first connector from a metal raw material in an additive manufacturing process; and
generating, layer by layer, the second connector from a metal raw material in an additive manufacturing process.

10. The method according to claim 9, wherein the additive manufacturing process includes selective laser melting.

11. A vehicle body structure, comprising:
a connecting assembly comprising:
a first connector comprising a frame part that has a receiving opening extending in a first frame direction, at least one first snap fit structure integrally formed with the frame part and extending in the receiving opening along the first frame direction, and a first coupling interface for coupling the first connector to the first part; and
a second connector comprising a plug-in part that extends in a first plug direction and has an outer shape corresponding to the receiving opening of the frame part of the first connector so that the plug-in part is configured for being introduced into the receiving opening of the frame part with the first plug direction extending parallel to the first frame direction, at least one second snap fit structure integrally formed with the plug-in part and extending in the first plug direction on an inner surface of the plug-in part, the second snap fit structure being configured to releasably engage with the first snap fit structure, and a second coupling interface for coupling the second connector to the second part,
wherein the frame part of the first connector and the plug-in part of the second connector each are manufactured in an additive manufacturing process from a metal material,
wherein the first part is fixed to the coupling interface of the first connector;
wherein the second part is fixed to coupling interface of the second connector;
wherein the plug-in part of the second connector is positioned in the receiving opening of the frame part of the first connector; and
wherein the second snap fit structure of the second connector is engaged with the first snap fit structure of the first connector.

12. The vehicle body structure according to claim 11, wherein one of the first part or the second part is a B-pillar module, and wherein the other one of the first part or the second part is a roof module.

13. A method for assembling the vehicle body structure according to claim 11, comprising:
coupling the first part to the coupling interface of the first connector;
coupling the second part to the coupling interface of the second connector;
introducing the plug-in part of the second connector into the receiving opening of the frame part of the first connector; and engaging the second snap fit structure of the second connector and the first snap fit structure of the first connector.

* * * * *